United States Patent
Lin

(10) Patent No.: US 6,915,996 B2
(45) Date of Patent: Jul. 12, 2005

(54) PIVOTAL SHAFT ASSEMBLY FOR PLANE DISPLAYS

(76) Inventor: Chin-Chih Lin, 3F, No. 128, Cha-Zhuang 1st Street, Kuei Shan, Taoyuan Hsien (TW)

( * ) Notice: Subject to any disclaimer, the term of this patent is extended or adjusted under 35 U.S.C. 154(b) by 0 days.

(21) Appl. No.: 10/751,921

(22) Filed: Jan. 7, 2004

(65) Prior Publication Data

US 2005/0127261 A1 Jun. 16, 2005

(30) Foreign Application Priority Data

Dec. 11, 2003 (TW) .................................. 92221770 U

(51) Int. Cl.⁷ .............................................. A47F 5/00
(52) U.S. Cl. ............................ 248/288.51; 248/288.31; 248/481; 248/917
(58) Field of Search ....................... 248/288.11, 288.31, 248/288.51, 276.1, 917–920, 481, 484

(56) References Cited

U.S. PATENT DOCUMENTS

| | | | | |
|---|---|---|---|---|
| 1,934,141 A | * | 11/1933 | Prentice ....................... | 280/492 |
| 4,382,572 A | * | 5/1983 | Thompson ................... | 248/484 |
| 4,461,439 A | * | 7/1984 | Rose ............................ | 248/51 |
| 5,271,651 A | * | 12/1993 | Blatt et al. ................... | 294/88 |
| 6,220,556 B1 | * | 4/2001 | Sohrt et al. ............... | 248/279.1 |
| 6,367,756 B1 | * | 4/2002 | Wang ........................ | 248/278.1 |
| 6,409,475 B1 | * | 6/2002 | Ho .............................. | 416/63 |

FOREIGN PATENT DOCUMENTS

EP  1139003  * 10/2001

* cited by examiner

Primary Examiner—Leslie A. Braun
Assistant Examiner—Tan Le
(74) Attorney, Agent, or Firm—Troxell Law Office, PLLC

(57) ABSTRACT

The present invention discloses a pivotal shaft assembly for plane displays, including a bottom plate, a fixing-member mounted at the front side of the bottom plate and having a positioning ball integrally coupled to the front side of a support base of the spherical nest device, a rotational member having two extension rods extended from the rear side of a connecting plate, each extension rod at one end having a connecting end and a corresponding axial hole thereon along its axial direction, and two inner sides of the connecting ends clamping the positioning ball by pressing on a curve groove corresponding to the curvature of the positioning ball with the inner sides, and two adjusting members of the extension rod passing through the axial hole to support a pressing ring, such that the positioning ball being clamped securely along the same axis and capable of moving along its surface to provide a multi-directional adjustment.

10 Claims, 3 Drawing Sheets

PIVOTAL SHAFT ASSEMBLY FOR PLANE DISPLAYS

FIELD OF THE INVENTION

The present invention relates to a pivotal shaft assembly, more particularly to a pivotal shaft assembly for plane displays which allows users to make a multi-directional adjustment to the angle of elevation of the plane displays.

BACKGROUND OF THE INVENTION

Since a plane display such as a liquid crystal display (LCD) monitor, an LCD TV, or a plasma TV has special features of lightness, thinness, shortness, and compactness, therefore the plane display has become a mainstream of the display product and gradually replaces the traditional cathode ray tube (CRT). In general, a vertical type plane display has a pivotal shaft device between the main body and the base of the display such as a rotational shaft disposed on each of the two sides of the display to provide users an optimal viewing angle. In this way, the main body of the display can be adjusted with an inclined angle forward or backward with respect to the base.

Considering the limited space available, some plane displays are hung to a fixed object such as a partition in an office, an exhibition wall, or a public open space by means of a standard connecting plate being connected to the rear side of the display. The rear side of the connecting plate is then connected to a rotational shaft device which is capable of swinging in a transversal direction or a longitudinal direction, and the connecting plate is fixed onto a wall by a bottom plate, so that the plane display can be adjusted with an inclined angle forward or backward with respect to the base or rotated sideway.

However, it still cannot meet the requirements for the multi-directional adjustment. Therefore, related manufacturers usually adopt a spherical nest device, which is frequently used in lamps for the multi-directional adjustment. Such spherical nest device is disposed at the front side of the pivotal shaft assembly, and a lateral side of the spherical nest device is disposed next to a rotational shaft device, such that the spherical nest device can adjust the frictional torque by a two-way threaded connection. However, if one of the lateral sides is not secured, the spherical nest device will be loosened or fallen off, resulting in undesirable effects.

SUMMARY OF THE INVENTION

In view of the foregoing shortcomings, the inventor of this invention based on years of experience of the design and marketing of office peripheral products to conduct extensive research and development and perform experiments to overcome the shortcomings of the prior art, and finally invented the "pivotal shaft assembly for plane displays" in accordance with this invention.

The primary objective of the present invention is to provide a pivotal shaft assembly for plane displays, which comprises: a bottom plate; a fixing member, being mounted at a front side of the bottom plate and having a positioning ball integrally coupled to a front side of a support base of the spherical nest device, a rotational member having two extension rods extended from a rear side of a connecting cover, each extension rod at one end having a connecting end and a corresponding axial hole thereon along its axial direction, and two inner sides of the connecting ends clamping a positioning ball by pressing on a curve groove corresponding to the curvature of the positioning ball with the inner sides, and two adjusting members of the extension rod passing through the axial hole to support a pressing ring, such that the positioning ball being clamped securely along the same axis and capable of moving along its surface to provide a multi-directional adjustment.

The secondary objective of the present invention is to provide a pivotal shaft assembly for plane displays, wherein the connecting cover has a curve latch plate protruded from one side to latch the inner side of a connecting section, and the connecting cover and the connecting plate individually have a guide groove and a connecting hole for connecting the connecting cover and the connecting plate by a fastener.

BRIEF DESCRIPTION OF THE DRAWINGS

The present invention can be more fully understood by reference to the following detailed description and accompanying drawings, in which.

DETAILED DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
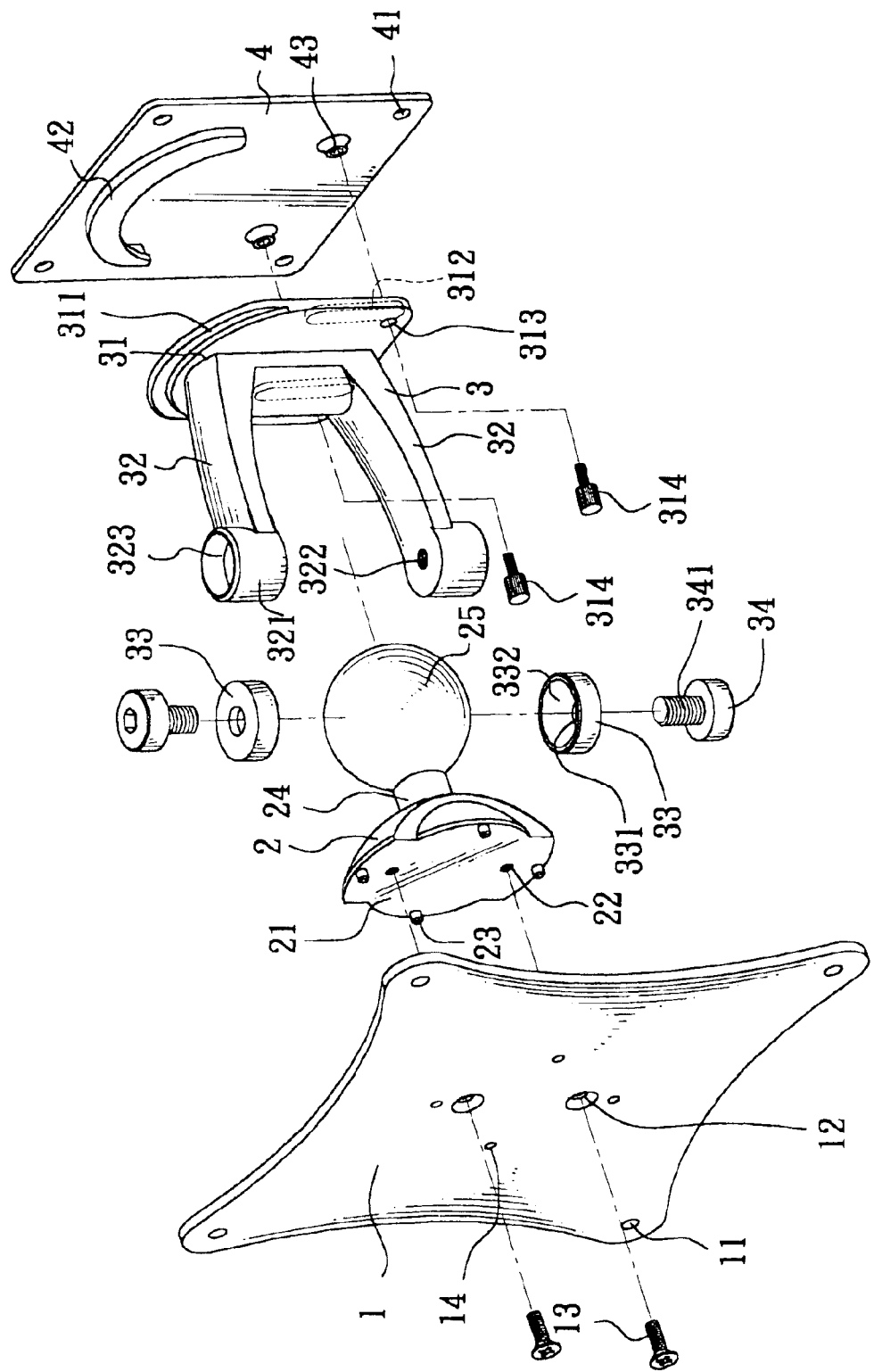
FIG. 1 is a perspective view of the disassembled parts of the pivotal shaft assembly according to the present invention.
Figure 2:
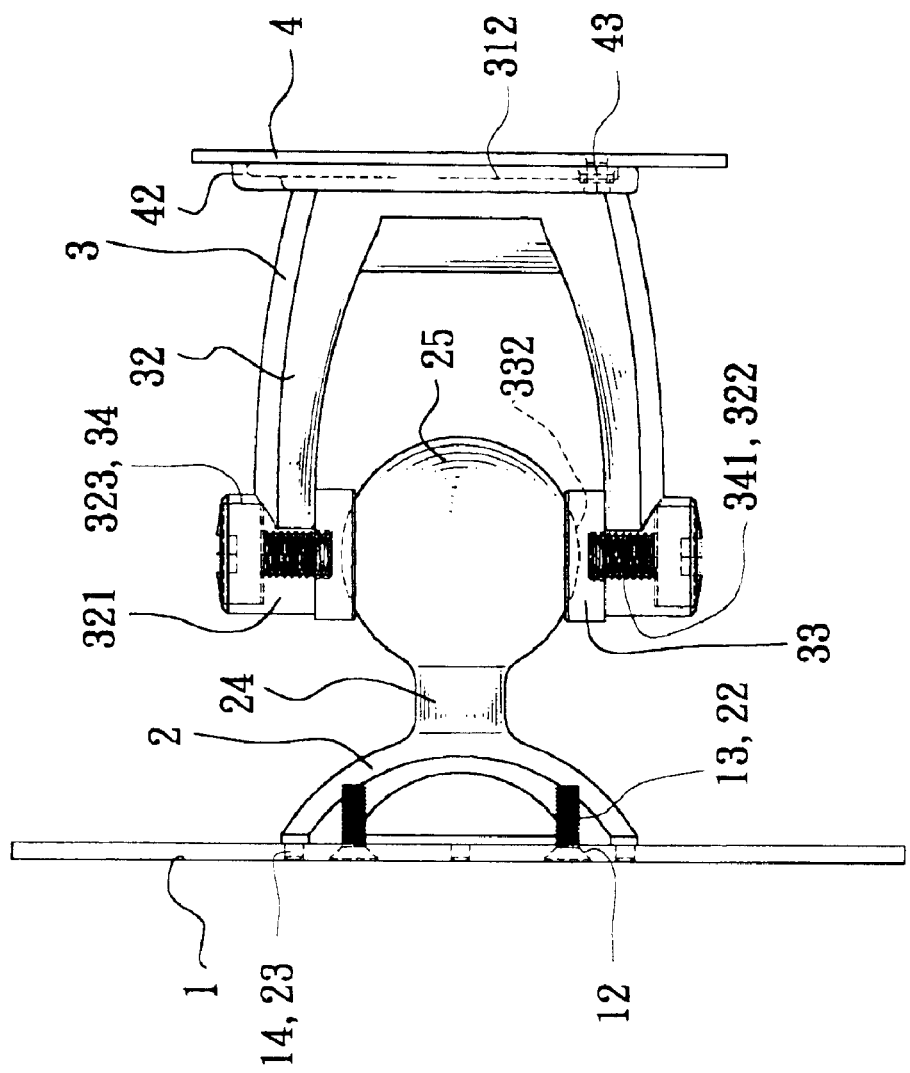
FIG. 2 is a cross-sectional view of the pivotal shaft assembly according to the present invention.

Please refer to FIGS. 1 and 2 for the pivotal shaft device according to this invention. The pivotal shaft comprises a bottom plate 1, a fixing member 2, a rotational member 3, and a connecting cover 4; wherein the bottom plate 1 is a plate having a plurality of plate holes or plate grooves 11 on its surface for passing a screw through and securing the bottom plate 1 to a fixed object such as a wall, and at least one through hole 12 at its center for passing a screw 13 through and being secured into a threaded hole 22 at the bottom of the fixing member 2. Further, a plurality of positioning holes is disposed around the through holes 12 for aligning and securing a positioning tenon at the bottom of the fixing member 2 with the positioning hole 12.

The fixing member 2 is a fixed object having a through hole 12 and a positioning hole 14 disposed at the corresponding positions on the bottom of the support base 21 to form a threaded hole 22 and a positioning tenon 23 respectively as to secure the fixing member 2 vertically onto the bottom plate 1. However, it is a prior art and will not be described here. The technical characteristics of this invention reside on the support base 21 being movably extended from a neck section 24, and the neck section 24 being integrally coupled to a positioning ball 25.

The rotational member 3 is a rack, having an extension rod 32 extended from one side of the connecting cover 31 and a connecting end 321 at each end of the extension rod 32. An axial hole 322 is disposed along the axial direction of the two connecting ends 321, and the distance between the two connecting ends 321 is larger than the diameter of the positioning ball 25. Two corresponding pressing rings 33 are disposed respectively on the inner wall of the connecting ends 321 and clamped by the two pressing rings 33. An adjusting member 34 having an axial rod 341 disposed at the outer side of the connecting end 321 passes through the axial hole 331 for adjusting the torque. A screwing or latching method is used to squeeze the two pressing rings 33 such that they clamp the positioning ball 25 tightly for adjusting the torque. The two pressing rings 33 are made of a friction resisting material such as Teflon. Further, each connecting end 321 has an inwardly concave accommodating groove 323 at its outer side for accommodating the adjusting member 34.

The connecting cover 31 has a curved latch plate 311 protruded from one end, a guide groove 312 disposed on each of the two corresponding edges of the connecting cover 31, and a groove hole 313 at the end section of the connecting cover 31.

Figure 3:
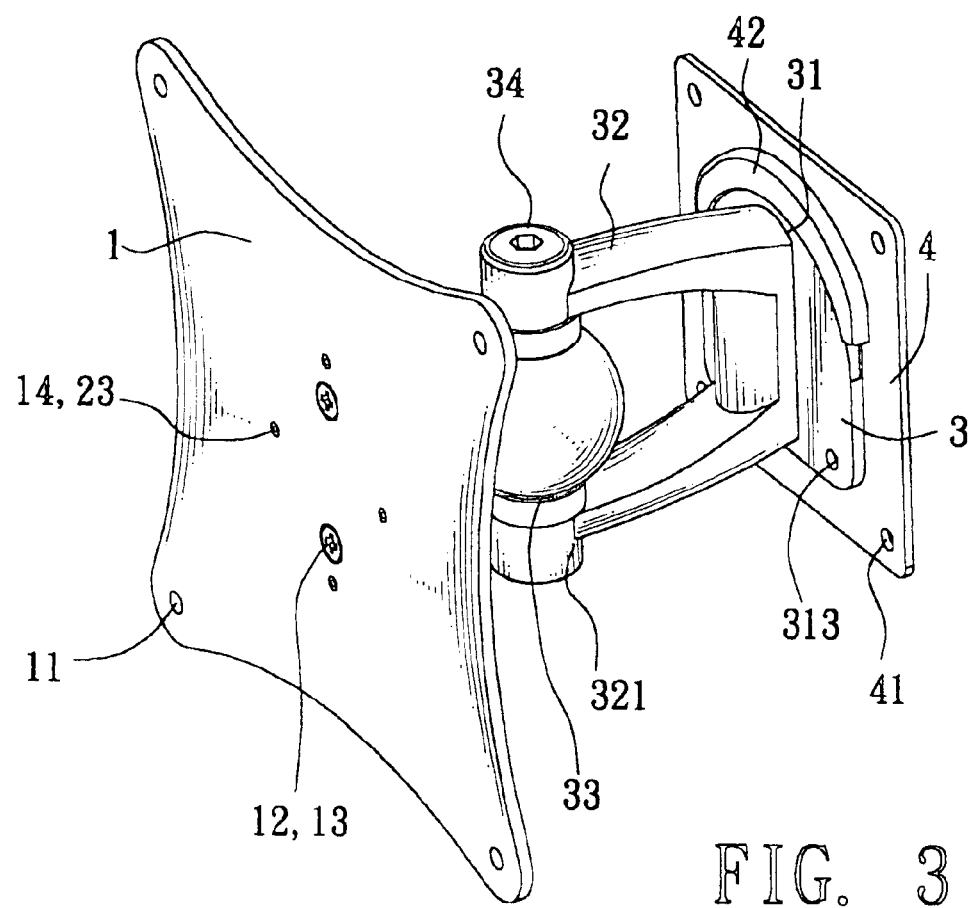
FIG. 3 is a schematic circuit diagram of a preferred embodiment of the present invention.

A plate hole 41 around the connecting plate 4 is for the screw to pass through and be secured onto a plane display, and a curved connecting section 42 is latched with a latch plate 311 such that the two connecting holes 43 protruded from the other side move along the guide groove 312 until being aligned with the groove hole 313. Finally, the two fasteners 314 such as hand knob threaded bolts pass through the groove hole 313 by rotating the fastener 314 by hands as to secure the fasteners 314 with the connecting holes 43. Therefore, the plane display can be assembled to the front side of the pivotal shaft of this invention. The perspective view of the assembled structure is shown in FIG. 3.

Please refer to the figures. When the pivotal shaft of this invention is used, users just need to adjust the plane display, so that the connecting plate 4 drives the rotational member 3 to rotate. Since the two pressing rings 33 between the two extension rods 32 clamp the positioning ball 25 about the same axis, therefore the two pressing rings 33 will move along the surface of the positioning ball 25, and will not fall off. Thus, users can make adjustments for left and right movements, up and down movements, and multi-directional rotations.

This invention not only can reduce the quantity of components and simplify the maintenance and assembling processes, but also can quickly adjust the torque by operating the two adjusting members. Further, the long hand knob threaded bolt allows users to connect the rotational member with the connecting plate quickly without using a tool. Furthermore, the present invention makes use of two pressing rings disposed at two positions about the same axis to clamp the positioning ball and allow a multidirectional rotation for the adjustment of the plane display, which has the same function as that of the complicated prior-art spherical nest device. The pivotal shaft according to the present invention has a novel excellent pivotal shaft structure.

In summation of the above description, the present invention enhances the performance of the conventional structure, and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pivotal shaft assembly for plane displays, comprising:

a bottom plate;

a fixing member, being mounted at a front side of said bottom plate and composed of a support base and a positioning ball disposed at the front side of said support base; and a rotational member, having two extension rods extended from a rear side of a connecting cover plate, each extension rod at one end having a connecting end and a corresponding axial hole thereon along an axial direction, and two inner sides of said connecting ends clamping said positioning ball by pressing on a pressing rings each having an inner side curve groove corresponding to the curvature of said positioning ball, and two adjusting members of said extension rod passing through said axial hole of said connecting ends to support said pressing ring, such that said positioning ball being clamped securely on opposing sides and capable of moving along a surface to provide a multi-directional adjustment.

2. The pivotal shaft assembly for plane displays of claim 1, wherein said bottom plate has a member selected from a collection of a plate hole and a plate groove for allowing a screw to pass through and couple to a fastener.

3. The pivotal shaft assembly for plane displays of claim 1, wherein said bottom plate at its center has at least one through hole, and the support base of said fixing member at its bottom has a corresponding threaded joining hole for coupling said bottom plate and said support base.

4. The pivotal shaft assembly for plane displays of claim 1, wherein said bottom plate has a plurality of positioning holes and said support base at its bottom has a positioning tenon for being inserted into said positioning hole.

5. The pivotal shaft assembly for plane displays of claim 1, further comprising a neck section between said support base and said positioning ball.

6. The pivotal shaft assembly for plane displays of claim 1, wherein said connecting cover has a curved latch plate protruded from one side for latching an inner side of a connecting plate, and a guide groove and a connecting hole are disposed on said connecting cover and said connecting plate respectively for coupling said connecting cover and said connecting plate by a fastener.

7. The pivotal shaft assembly for plane displays of claim 6, wherein said fastener is a hand knob threaded bolt.

8. The pivotal shaft assembly for plane displays of claim 1, wherein said each connecting end at its outer side has an accommodating groove for accommodating an adjusting member.

9. The pivotal shaft assembly for plane displays of claim 1, wherein said each pressing ring at its outer side has a ring hole for coupling with said extension rod.

10. The pivotal shaft assembly for plane displays of claim 1, wherein said pressing ring is made of a friction-resisting Teflon material.

* * * * *